US012480430B1

(12) United States Patent
Lee et al.

(10) Patent No.: US 12,480,430 B1
(45) Date of Patent: Nov. 25, 2025

(54) HYDRAULIC CLEANING APPARATUS FOR PARTICULATE MATTER REDUCTION DEVICE WITH RAPID DRYING AND DIFFERENTIAL PRESSURE MEASUREMENT CAPABILITY

(71) Applicants: Jae Keun Lee, Daegu (KR); Sang Bae Jeon, Daegu (KR)

(72) Inventors: Jae Keun Lee, Daegu (KR); Sang Bae Jeon, Daegu (KR)

(73) Assignees: Jae Keun Lee, Daegu (KR); HI-TECH DIESEL CORP., Daegu (KR)

( * ) Notice: Subject to any disclaimer, the term of this patent is extended or adjusted under 35 U.S.C. 154(b) by 0 days.

(21) Appl. No.: 19/320,712

(22) Filed: Sep. 5, 2025

(30) Foreign Application Priority Data

Jul. 30, 2025 (KR) .................. 10-2025-0103859

(51) Int. Cl.
 *B01D 46/79* (2022.01)
 *B01D 46/66* (2022.01)
 *F01N 3/023* (2006.01)

(52) U.S. Cl.
 CPC .......... *F01N 3/0237* (2013.01); *B01D 46/66* (2022.01); *B01D 46/79* (2022.01)

(58) Field of Classification Search
 CPC .................. B01D 46/66; B01D 46/79
 See application file for complete search history.

(56) References Cited

FOREIGN PATENT DOCUMENTS

JP          3193464 U   * 10/2014

* cited by examiner

*Primary Examiner* — Robert A Hopkins
(74) *Attorney, Agent, or Firm* — PARK LAW FIRM

(57) ABSTRACT

The present invention relates to a novel hydraulic cleaning apparatus for a particulate matter reduction device that enables rapid drying and differential pressure measurement, effectively cleaning, drying, and measuring differential pressure of particulate matter reduction devices in diesel vehicles.
When an operator places the particulate matter reduction device (1) on the support case (21) and inputs a cleaning command via the input unit (37), the control unit (36) automatically controls the water supply pump (25), ring blower (26), three-way valve (27), and heater (31) to supply cleaning water and air to the particulate matter reduction device (1). This automated process cleans and dries the device, making operation very simple.
Additionally, the differential pressure gauge (38) in the main body (10) measures the differential pressure of the particulate matter reduction device (1), enabling easy determination of whether the particulate matter reduction filter (3) has been sufficiently cleaned.

4 Claims, 9 Drawing Sheets

HYDRAULIC CLEANING APPARATUS FOR PARTICULATE MATTER REDUCTION DEVICE WITH RAPID DRYING AND DIFFERENTIAL PRESSURE MEASUREMENT CAPABILITY

FIELD OF THE INVENTION

The present invention relates to a novel hydraulic cleaning apparatus for a particulate matter reduction device that is capable of rapid drying and differential pressure measurement, which can effectively clean, dry, and measure differential pressure of a particulate matter reduction device installed in a diesel vehicle.

DISCUSSION OF RELATED ART

Recently, as regulations on contaminants such as nitrogen oxide and other particulate matter emitted from diesel engines have become stricter, particulate matter reduction devices for purifying exhaust gas have been mounted in the exhaust systems of diesel vehicles.

As shown in FIG. 1, such a particulate matter reduction device includes a housing 2 extending vertically and having an inlet 2a and an outlet 2b formed at upper and lower ends, and a particulate matter reduction filter 3 provided inside the housing 2.

However, when used for a long period of time, the particulate matter reduction device 1 has degraded performance due to the accumulation of contaminants included in exhaust gas inside the particulate matter reduction filter 3.

Accordingly, after being used for a predetermined time, the particulate matter reduction device 1 is subjected to a regeneration process to remove contaminants attached to the particulate matter reduction filter 3.

In this way, when the particulate matter reduction device 1 is regenerated, a method of injecting cleaning water into the housing 2 through the inlet 2a to remove contaminants attached to the particulate matter reduction filter 3 may be generally used.

However, since this operation of cleaning the particulate matter reduction filter 3 is primarily performed manually, there is a problem that the operation is very cumbersome.

In addition, after the contaminants attached to the particulate matter reduction filter 3 are removed, the particulate matter reduction filter 3 needs to be dried and differential pressure needs to be measured, and since these operations are performed separately, there is a problem that the operation is very cumbersome.

Accordingly, a new method of solving these problems is needed.

RELATED ART DOCUMENTS

Patent Document

[Patent Document 1] Korean Registration Patent No. 10-0670939

SUMMARY OF THE INVENTION

The present invention is directed to providing a novel hydraulic cleaning apparatus for a particulate matter reduction device that is capable of rapid drying and differential pressure measurement, which can effectively clean, dry, and measure differential pressure of a particulate matter reduction device (1) installed in a diesel vehicle.

According to the present invention, there is provided a hydraulic cleaning apparatus for a particulate matter reduction device that is for cleaning a particulate matter reduction device (1), including a housing (2) which extends in a vertical direction and in which an inlet (2a) and an outlet (2b) are formed at upper and lower ends thereof and a particulate matter reduction filter (3) provided inside the housing (2), which includes a main body (10) which is formed in a box shape with an internal space and in which the internal space is divided into a cleaning room (13), a water storage room (14), and a machine room (15) by a horizontal partition (11) and a vertical partition (12) provided therein, wherein a communication hole (11a) connecting the cleaning room (13) to the water storage room (14) is formed in the horizontal partition (11), a support case (21) which is provided in the cleaning room (13) of the main body (10) for the particulate matter reduction device (1) to be placed on an upper surface thereof and which has a discharge hole (21a) formed in the upper surface, a connecting member (22) provided on an upper portion of the support case (21) and moved upward and downward by an elevating cylinder (23) to be coupled to an upper end of the particulate matter reduction device (1) placed on the support case (21), a filter unit (24) provided on one side of the main body (10), a water supply pump (25) which is provided in the water storage room (14) and connected to the filter unit (24) by a first water supply pipe (25a) so as to press cleaning water stored in the water storage room (14) and supply the pressed cleaning water to the filter unit (24), a ring blower (26) provided inside the machine room (15), a three-way valve (27) having first and second supply ports (27a, 27b) and a discharge port (27c), wherein the first supply port (27a) is connected to the filter unit (24) through a second water supply pipe (29), the second supply port (27b) is connected to the ring blower (26) through an air supply pipe (30), and the discharge port (27c) is connected to the connecting member (22) through a discharge pipe (28) and controlling cleaning water that has passed through the filter unit (24) or air supplied from the ring blower (26) to be supplied to the connecting member (22) through the discharge pipe (28) according to an operation, a heater (31) provided on a middle portion of the air supply pipe (30) to heat air supplied through the air supply pipe (30), an inlet temperature sensor (32) which is provided on the connecting member (22) and measures a temperature of air inside the connecting member (22), an outlet temperature sensor (33) which is provided inside the support case (21) and measures a temperature of air discharged to the support case (21), a humidity sensor (34) which is provided inside the support case (21) and measures humidity of the air discharged to the support case (21), a differential pressure sensor (35) which is provided on the air supply pipe (30) and measures a pressure of the air supplied through the air supply pipe (30), a branch pipe (39) branched from the air supply pipe (30), a differential pressure gauge (38) connected to the branch pipe (39), an air supply control valve (41) provided on the branch pipe (39), and a control unit (36) which receives signals of the inlet temperature sensor (32), the outlet temperature sensor (33), the humidity sensor (34), and the differential pressure sensor (35) and controls operations of the elevating cylinder (23), the water supply pump (25), the ring blower (26), the three-way valve (27), the heater (31), and the air supply control valve (41).

According to another feature of the present invention, the control unit (36) may be provided with an input unit (37) that allows an operator to input a control command, and when the operator places the particulate matter reduction device (1) on the support case (21) and then manipulates the input unit (37) to input a cleaning command, the control unit (36) may control the elevating cylinder (23) to move the connecting member (22) downward so that the connecting member (22) is coupled to an upper surface of the particulate matter reduction device (1), control the water supply pump (25), the ring blower (26), and the three-way valve (27) so that the cleaning water and the air are supplied to the particulate matter reduction device (1) through the connecting member (22) to clean the particulate matter reduction filter (3) of the particulate matter reduction device (1), stop the water supply pump (25) when a preset time has elapsed, control the ring blower (26), the three-way valve (27), and the heater (31) to supply high-temperature air to the particulate matter reduction device (1) through the connecting member (22) to dry the particulate matter reduction device (1), receive a signal of the humidity sensor (34) and, when humidity inside the support case (21) reaches target humidity, stop the heater (31), cool the particulate matter reduction device (1) using the air supplied by the ring blower (26), and stop the ring blower (26) to complete the operation when the temperature inside the support case (21) reaches a pre-input cooling temperature.

According to still another feature of the present invention, when the operator places the particulate matter reduction device (1) on the support case (21) and then manipulates the input unit (37) to input a differential pressure measurement command, the control unit (36) may control the elevating cylinder (23) to move the connecting member (22) downward so that the connecting member (22) is coupled to an upper surface of the particulate matter reduction device (1), control the three-way valve (27) and the ring blower (26) so that high-pressure air is supplied to the connecting member (22), and receive a signal of the differential pressure sensor (35) to measure a pressure of the air supplied through the air supply pipe (30) so as to measure differential pressure.

According to yet another feature of the present invention, the main body (10) may be provided with an upper partition (16), which is provided at a higher location than the horizontal partition (11) and forms an upper chamber (17) on an upper portion of the cleaning room (13), an exhaust hole (18) may be formed in a rear surface of the cleaning room (13) of the main body (10), an exhaust pipe (19) extending rearward from the main body (10) may be provided in the exhaust hole (18), an insulation panel (44) may include a bent portion (44a) disposed to surround front outer portions of the support case (21) and the particulate matter reduction device (1) placed on the support case (21) and extensions (44b) extending rearward from both ends of the bent portion (44a) so that both ends are coupled to an inner rear surface of the cleaning room (13) to be movable upward and downward, an elevating driving unit (45) connected to the insulation panel (44) to elevate the insulation panel (44) and an exhaust fan (46) provided in the exhaust pipe (19) may be further provided, the exhaust hole (18) may be formed to be located between the extensions (44b) of the insulation panel (44), a cut portion (16a) corresponding to the insulation panel (44) may be formed in the upper partition (16) so that the insulation panel (44) rises into the upper chamber (17) through the cut portion (16a), and the control unit (36) may control the elevating driving unit (45) when cleaning the particulate matter reduction device (1) to move the insulation panel (44) that has risen into the upper chamber (17) downward so that the insulation panel (44) surrounds the outer portions of the support case (21) and the particulate matter reduction device (1) placed on the support case (21) and drives the exhaust fan (46) while moving the insulation panel (44) downward when drying and cleaning the particulate matter reduction device (1) to discharge air around the heated particulate matter reduction device (1) to the outside.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
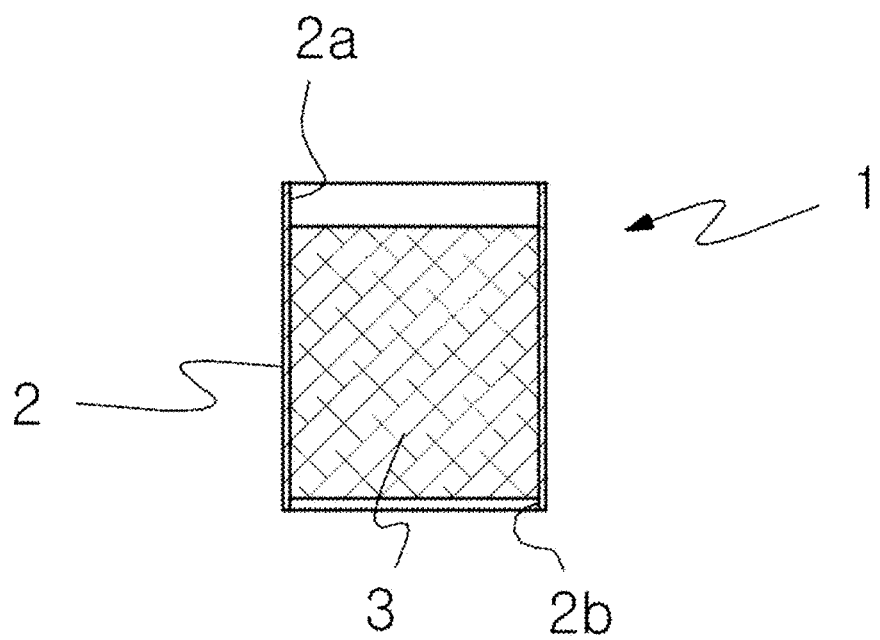
FIG. 1 is a reference view showing a typical particulate matter reduction device.

Hereinafter, the present invention will be described in detail with reference to the accompanying exemplary drawings.

FIGS. 2 to 6 show a hydraulic cleaning apparatus for a particulate matter reduction device according to the present invention, and the particulate matter reduction device 1 includes a housing 2 extending vertically and having an inlet 2a and an outlet 2b formed at upper and lower ends, and a particulate matter reduction filter 3 provided inside the housing 2.

In addition, the hydraulic cleaning apparatus for a particulate matter reduction device according to the present invention includes a main body 10 which is formed in a box shape with an internal space and in which the internal space is divided into a cleaning room 13, a water storage room 14, and a machine room 15 by a horizontal partition 11 and a vertical partition 12 provided therein, a support case 21 which is provided in the cleaning room 13 of the main body 10 so that the particulate matter reduction device 1 may be placed on an upper surface thereof and which has a discharge hole 21a formed in the upper surface, a connecting member 22 provided on an upper portion of the support case 21 and moved upward and downward by an elevating cylinder 23 to be coupled to an upper end of the particulate matter reduction device 1 placed on the support case 21, a filter unit 24 provided on one side of the main body 10, a water supply pump 25 which is provided in the water storage room 14 and connected to the filter unit 24 by a first water supply pipe 25a so as to press cleaning water stored in the water storage room 14 and supply the pressed cleaning water to the filter unit 24, a ring blower 26 provided inside the machine room 15, a three-way valve 27 having first and second supply ports 27a and 27b and a discharge port 27c, with the first supply port 27a being connected to the filter unit 24 through a second water supply pipe 29, the second supply port 27b being connected to the ring blower 26 through an air supply pipe 30, and the discharge port 27c being connected to the connecting member 22 through a discharge pipe 28 and controlling cleaning water that has passed through the filter unit 24 or air supplied from the ring blower 26 to be supplied to the connecting member 22 through the discharge pipe 28 according to an operation, a heater 31 provided on a middle portion of the air supply pipe 30 to heat the air supplied through the air supply pipe 30, an inlet temperature sensor 32 which is provided on the connecting member 22 and measures a temperature of air inside the connecting member 22, an outlet temperature sensor 33 which is provided inside the support case 21 and measures a temperature of air discharged to the support case 21, a humidity sensor 34 which is provided inside the support case 21 and measures humidity of the air discharged to the support case 21, a differential pressure sensor 35 which is provided on the air supply pipe 30 and measures a pressure of the air supplied through the air supply pipe 30, a branch pipe 39 branched from the air supply pipe 30, a differential pressure gauge 38 connected to the branch pipe 39, an air supply control valve 41 provided on the branch pipe 39, and a control unit 36 which receives signals of the inlet temperature sensor 32, the outlet temperature sensor 33, the humidity sensor 34, and the differential pressure sensor 35 and controls operations of the elevating cylinder 23, the water supply pump 25, the ring blower 26, the three-way valve 27, the heater 31, and the air supply control valve 41.

The main body 10 is formed in a rectangular box shape, and a front surface of the cleaning room 13 is open.

In this case, the main body 10 has an upper partition 16 located above a horizontal partition 11 to form an upper chamber 17 on an upper portion of the cleaning room 13.

In addition, a communication hole 11a connecting the cleaning room 13 to the water storage room 14 is formed in the horizontal partition 11, and a filter member 11b is provided on a lower surface of the communication hole 11a.

In addition, a lamp 42 and a ventilation fan 43 are provided on an upper portion of the cleaning room 13 of the main body 10.

The support case 21 is formed in a cylindrical shape with a larger diameter than the particulate matter reduction device 1 and an open lower surface and is fixed to an upper surface of the horizontal partition 11 to cover an upper portion of the communication hole 11a.

The connecting member 22 is formed in a funnel shape in which an inner diameter increases downward and a supply hole 22a connected to the discharge pipe 28 is formed in a central area of an upper surface thereof.

In this case, a diameter of a lower end of the connecting member 22 is formed to be larger than a diameter of the particulate matter reduction device 1.

An air cylinder that extends downward from the upper partition 16 and has a piston rod provided at a lower end and fixed to the upper surface of the connecting member 22 so that the connecting member 22 moves upward and downward according to expansion and contraction is used as the elevating cylinder 23.

The filter unit 24 is fixed to the outside of the main body 10, has a supply port 24a formed in one side, and a discharge port 24b formed in a lower side, and is formed to filter a cleaning liquid supplied to the supply port 24a to remove contaminants and then discharge the filtered cleaning liquid through the discharge port 24b.

The water supply pump 25 uses a submersible motor that is disposed inside the water storage room 14 to be submerged in the cleaning liquid stored in the water storage room 14.

The first water supply pipe 25a connects the water supply pump 25 to the supply port 24a of the filter unit 24.

The three-way valve 27 is controlled by the control unit 36 to selectively connect the first supply port 27a and the second supply port 27b to the discharge port 27c.

In this case, the three-way valve 27 and the heater 31 are provided inside the upper chamber 17.

The control unit 36 has an input unit 37 to allow an operator to manipulate the input unit 37 to input a control command to the control unit 36.

In this case, a heating temperature, target humidity, and a cooling temperature are input to the control unit 36.

When air is supplied through the branch pipe 39 placed on the upper surface of the particulate matter reduction filter 3 provided in the particulate matter reduction device 1, the differential pressure gauge 38 is formed to measure the differential pressure of the particulate matter reduction filter 3, that is, resistance generated when air passes through the particulate matter reduction filter 3, to measure the degree to which contaminants attached to the particulate matter reduction filter 3 have been removed.

Since various forms of the differential pressure gauge 38 have been developed and are in use, detailed description thereof will be omitted.

The operation of the hydraulic cleaning apparatus for a particulate matter reduction device formed in this way will now be described.

Figure 2:
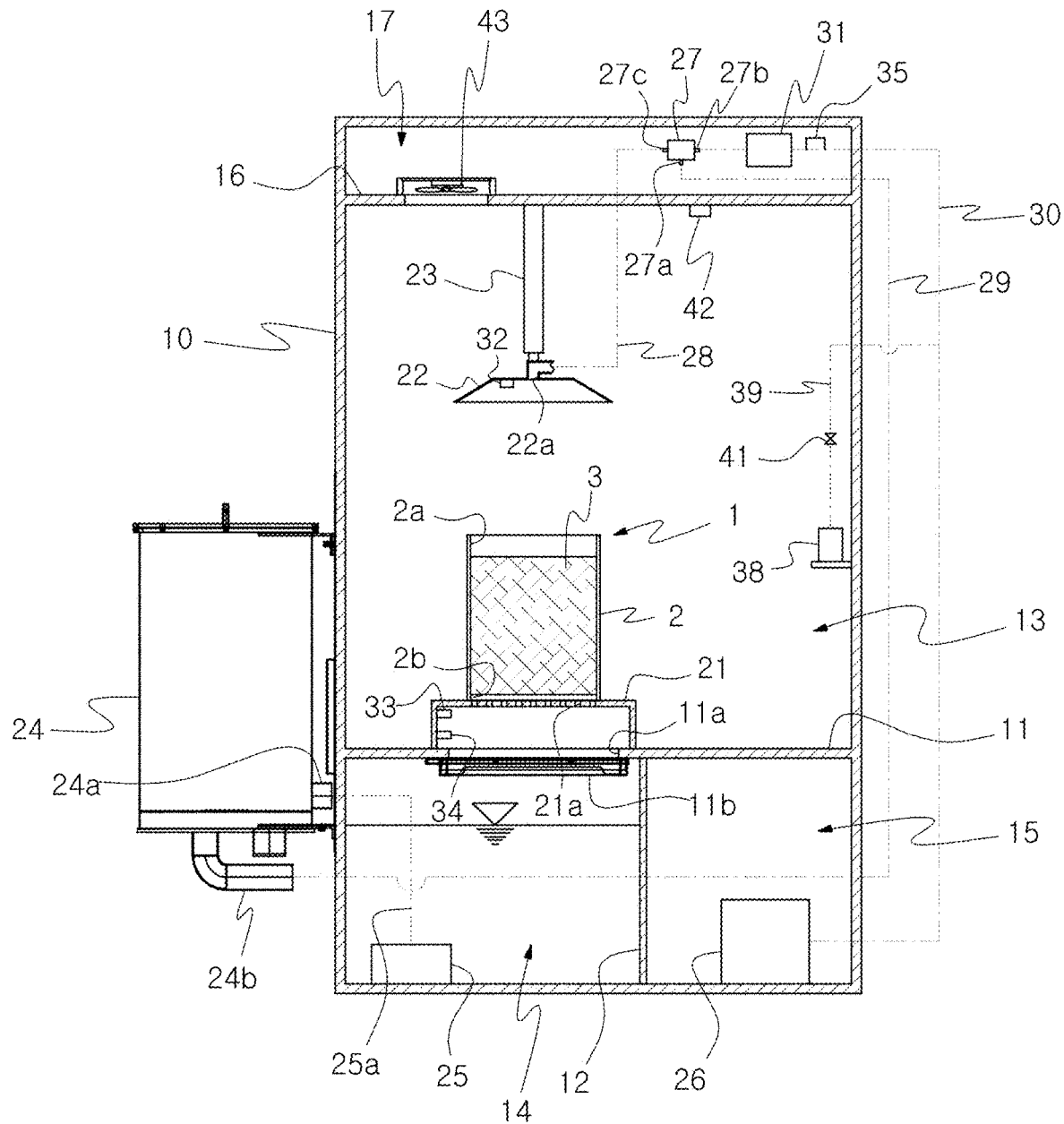
FIG. 2 is a front cross-sectional view showing a hydraulic cleaning apparatus for a particulate matter reduction device according to the present invention.
Figure 3:
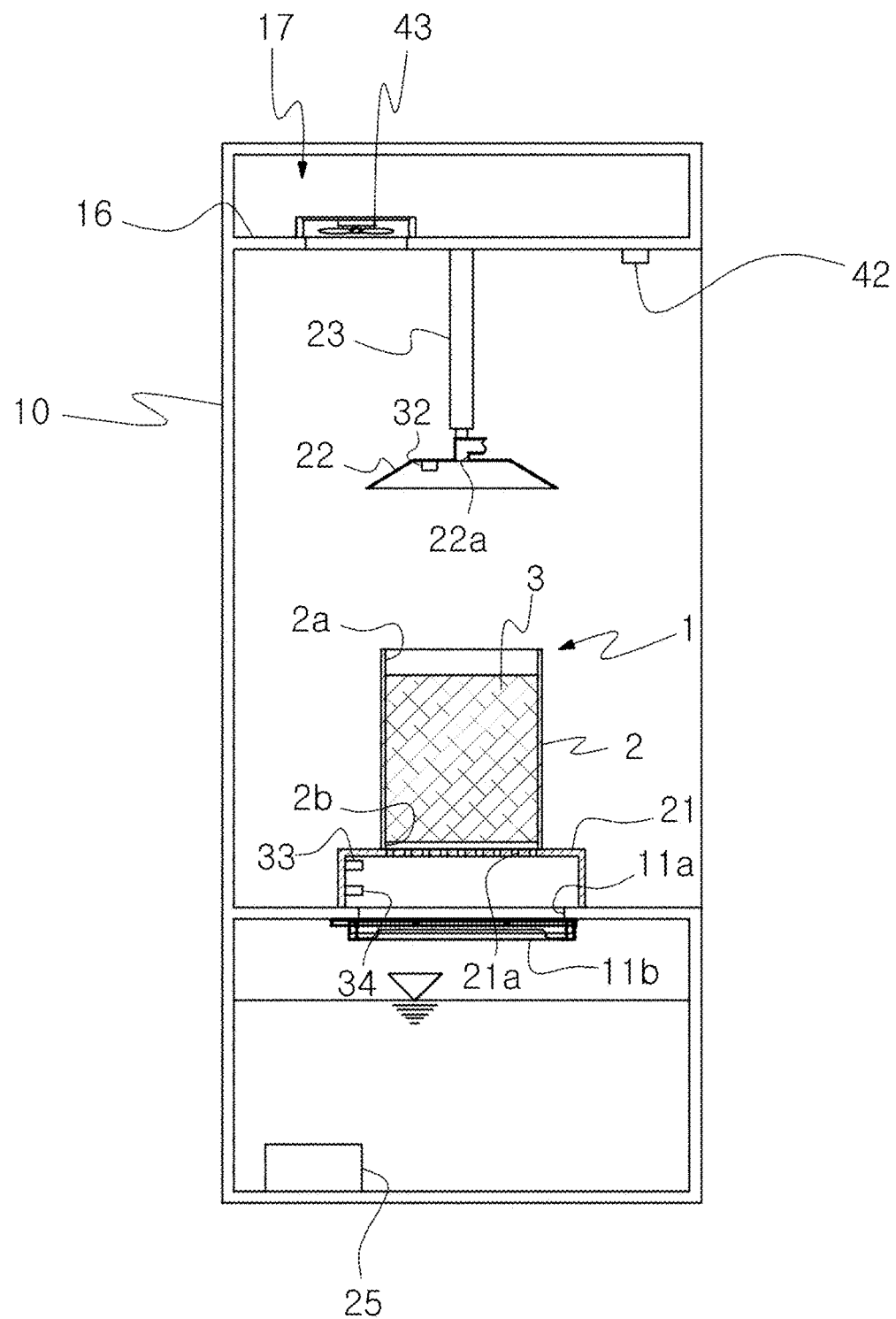
FIG. 3 is a side cross-sectional view showing the hydraulic cleaning apparatus for a particulate matter reduction device according to the present invention.
Figure 4:
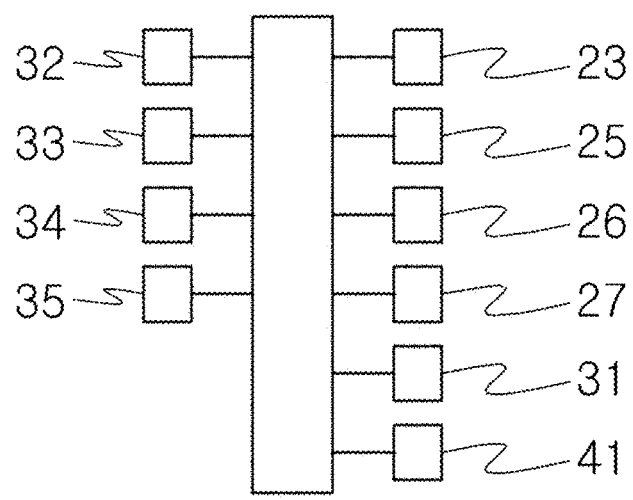
FIG. 4 is a block diagram of the hydraulic cleaning apparatus for a particulate matter reduction device according to the present invention.
Figure 5:
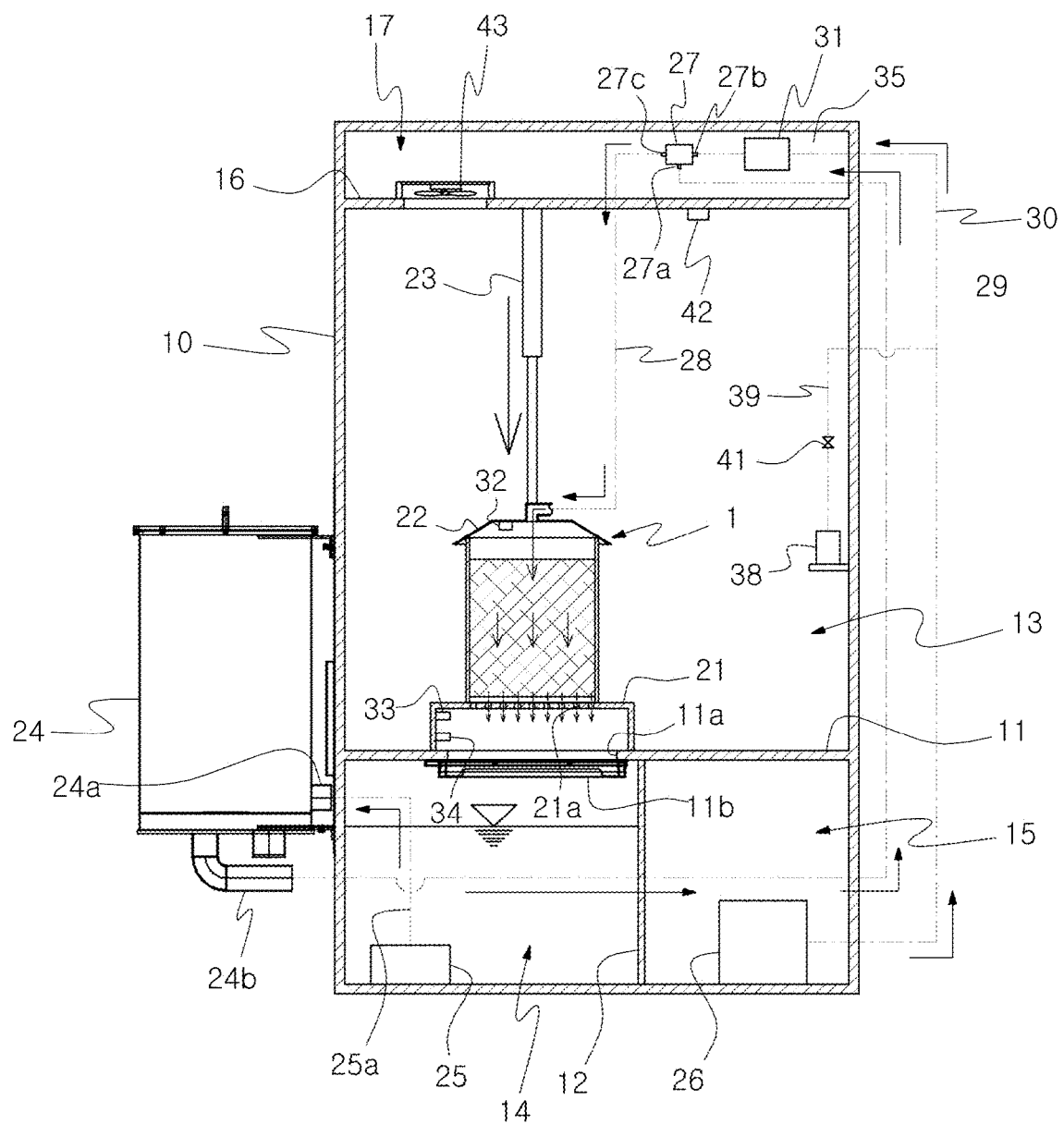
FIG. 5 is a front cross-sectional view showing the hydraulic cleaning apparatus for a particulate matter reduction device according to the present invention.
Figure 6:
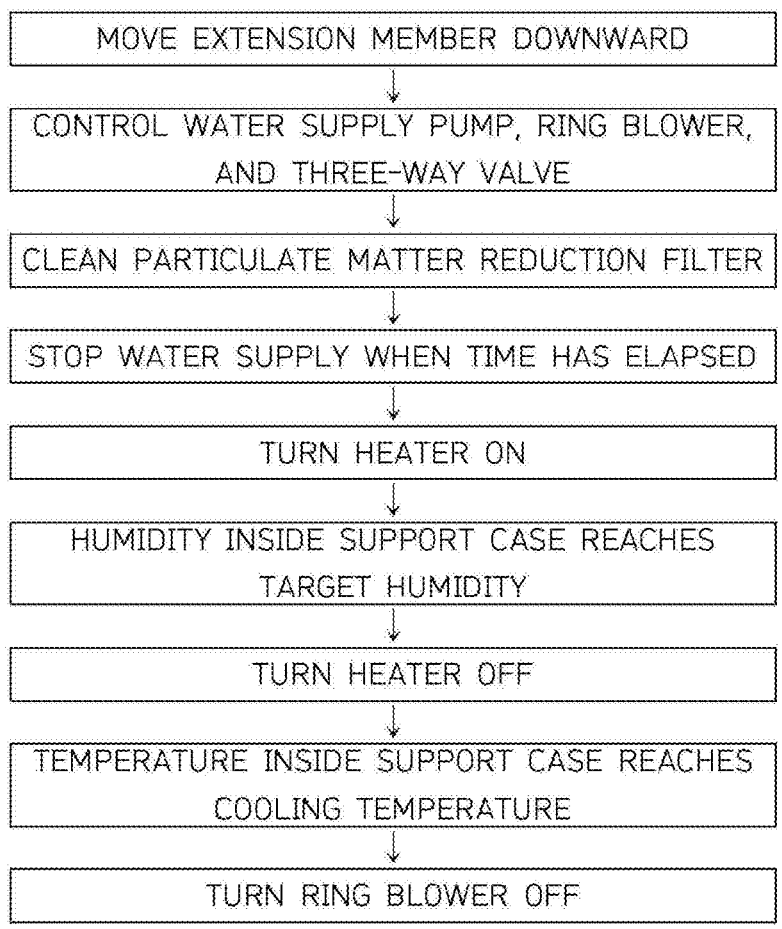
FIG. 6 is a flowchart showing the operation of the hydraulic pressure cleaning apparatus for a particulate matter reduction device according to the present invention.

First, as shown in FIGS. 2 and 3, when the operator places the particulate matter reduction device 1 on the support case 21 and then manipulates the input unit 37 to input a cleaning command, as shown in FIG. 5, the control unit 36 controls the elevating cylinder 23 to move the connecting member 22 downward so that the connecting member 22 is coupled to the upper surface of the particulate matter reduction device 1.

In addition, the control unit 36 controls the water supply pump 25, the ring blower 26, and the three-way valve 27 so that the cleaning water and air are supplied to the particulate matter reduction device 1 through the connecting member 22 to clean the particulate matter reduction filter 3 of the particulate matter reduction device 1.

In this case, the cleaning water that has cleaned the particulate matter reduction filter 3 while passing through the particulate matter reduction filter 3 is discharged to the water storage room 14 through the discharge hole 21a of the support case 21 and the communication hole 11a of the horizontal partition 11.

In addition, the control unit 36 controls the three-way valve 27 according to the cleaning method input by the operator through the input unit 37 so that the cleaning water and air are alternately supplied to the connecting member 22 or the cleaning water and air are supplied together to the particulate matter reduction device 1 through the connecting member 22.

In addition, when a preset time has elapsed, the control unit 36 stops the water supply pump 25 and controls the ring blower 26, the three-way valve 27, and the heater 31 so that high-temperature air is supplied to the particulate matter reduction device 1 through the connecting member 22 to dry the particulate matter reduction device 1. In this case, the control unit 36 controls the heater 31 while feeding back a signal of the inlet temperature sensor 32 in order to adjust the temperature of the air supplied to the connecting member 22 to maintain a pre-input heating temperature+3° C.

In addition, the control unit 36 receives the signal of the differential pressure sensor 35 and checks the degree to which the contaminants attached to the particulate matter reduction filter 3 have been cleaned.

That is, when the contaminants attached to the particulate matter reduction filter 3 have been sufficiently cleaned, the air supplied by the ring blower 26 passes smoothly through the particulate matter reduction filter 3 to reduce air pressure inside the air supply pipe 30 measured by the differential pressure sensor 35, and conversely, when the contaminants attached to the particulate matter reduction filter 3 have not been sufficiently cleaned, the air supplied by the ring blower 26 may not pass smoothly through the particulate matter reduction filter 3, and thus the air pressure inside the air supply pipe 30 measured by the differential pressure sensor 35 increases.

Accordingly, when the air pressure inside the air supply pipe 30 measured by the differential pressure sensor 35 is higher than a pre-set reference pressure, it is determined that the contaminants attached to the particulate matter reduction filter 3 have not been sufficiently cleaned, and as described above, the control unit 36 re-performs a cleaning operation of removing the contaminants attached to the particulate matter reduction filter 3 by supplying water and air to the particulate matter reduction filter 3 so that the contaminants are sufficiently removed, and then re-performs a drying operation of drying the particulate matter reduction filter 3 by supplying high-temperature air to the particulate matter reduction filter 3.

In addition, the control unit 36 receives a signal of the humidity sensor 34, and when humidity inside the support case 21 reaches target humidity, the control unit 36 determines that the particulate matter reduction filter 3 has been sufficiently dried and stops the heater 31.

In addition, the control unit 36 drives the ring blower 26 to continuously supply air to the connecting member 22 so that the particulate matter reduction device 1 is cooled by the air.

In addition, when the temperature inside the support case 21 reaches a pre-input cooling temperature, the control unit 36 stops the ring blower 26 to complete the operation.

In addition, when the operator places the differential pressure gauge 38 on the particulate matter reduction filter 3 of the particulate matter reduction device 1 placed on the support case 21 and manipulates the input unit 37 to input a differential pressure measurement command, the control unit 36 drives the ring blower 26 and opens the air supply control valve 41 so that air is supplied to the differential pressure gauge 38 to measure the differential pressure of the particulate matter reduction filter 3.

In the hydraulic cleaning apparatus for a particulate matter reduction device formed in this way, when the operator places the particulate matter reduction device 1 on the support case 21 and inputs a cleaning command by manipulating the input unit 37, the control unit 36 automatically controls the water supply pump 25, the ring blower 26, the three-way valve 27, and the heater 31 to supply cleaning water and air to the particulate matter reduction device 1, thereby cleaning and drying the particulate matter reduction device 1, making it very easy to clean and dry the particulate matter reduction device.

In addition, by measuring the differential pressure of the particulate matter reduction device 1 using the differential pressure gauge 38 provided in the main body 10, it is possible to easily determine whether the particulate matter reduction filter 3 has been sufficiently cleaned.

Figure 7:
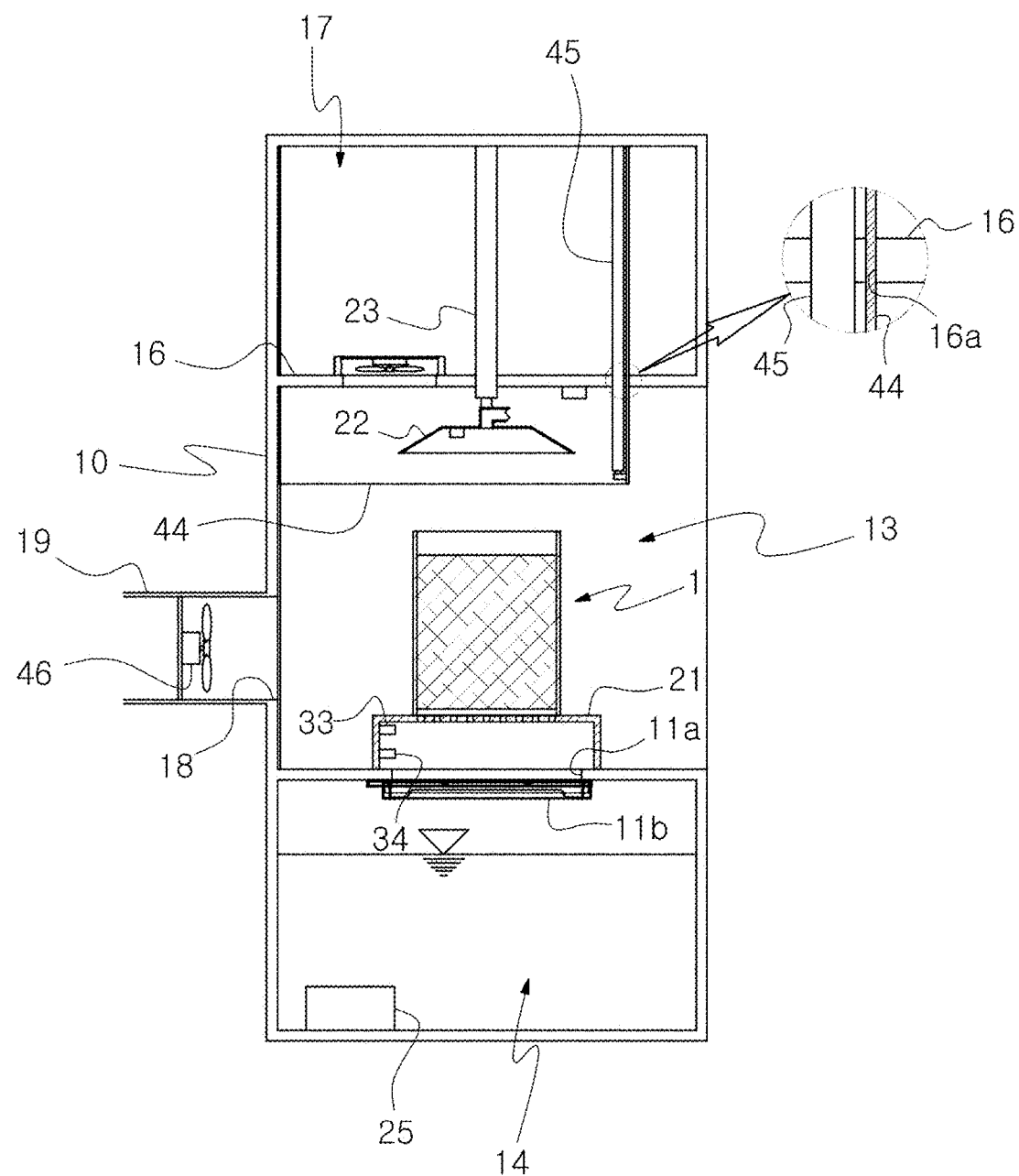
FIG. 7 is a side cross-sectional view of a hydraulic cleaning apparatus for a particulate matter reduction device according to a second embodiment of the present invention.
Figure 8:
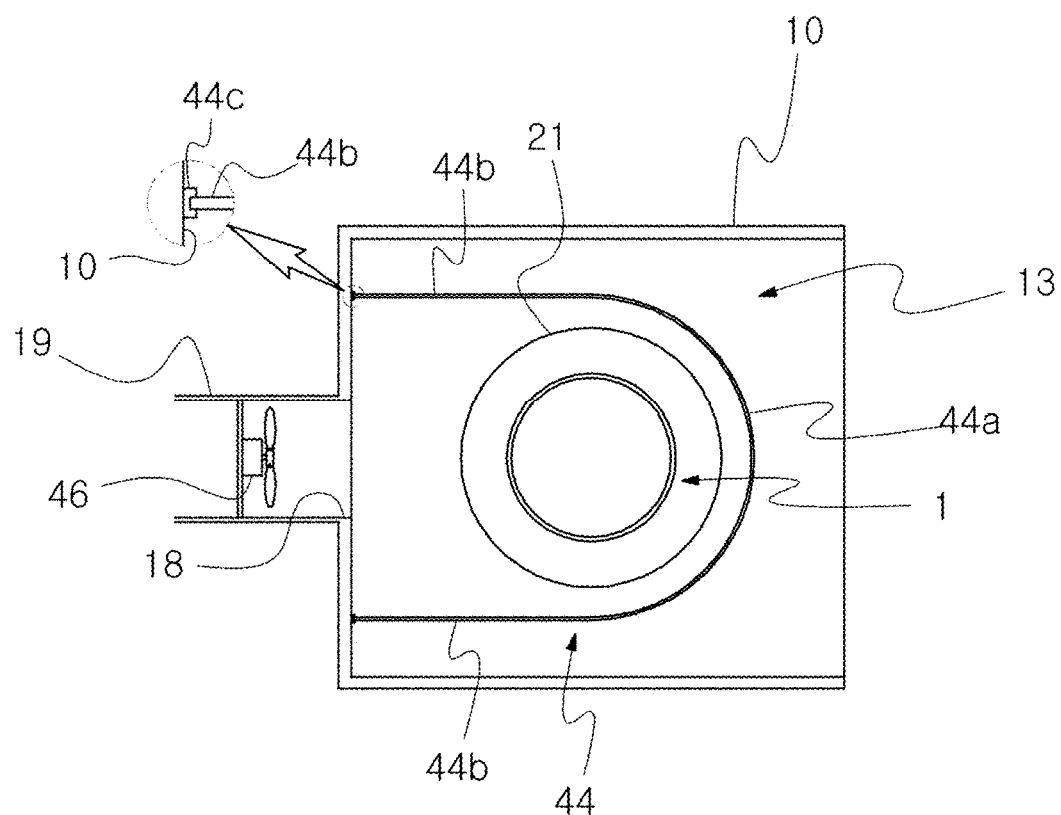
FIG. 8 is a plan cross-sectional view of the hydraulic cleaning apparatus for a particulate matter reduction device according to the second embodiment of the present invention.
Figure 9:
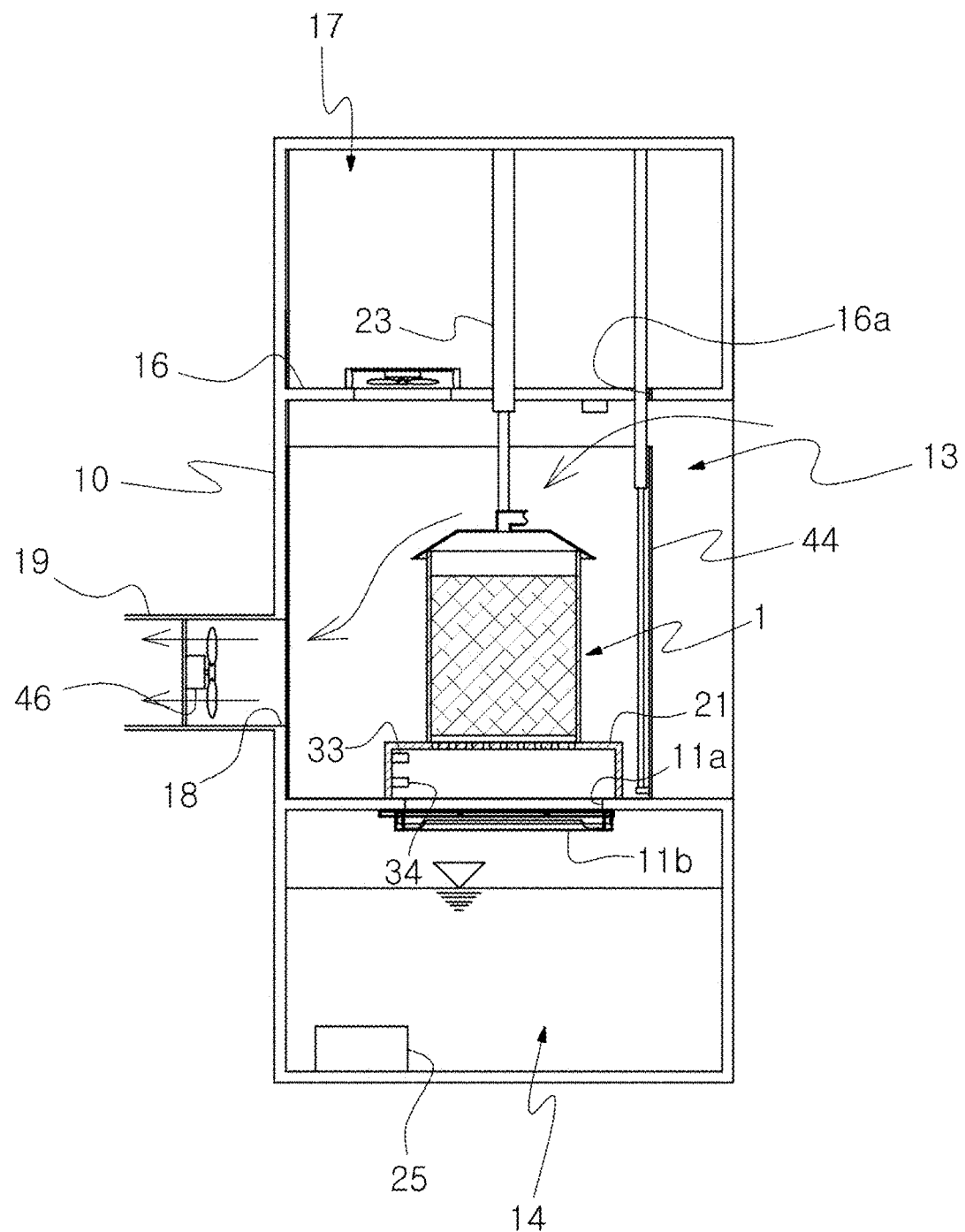
FIG. 9 is a side cross-sectional view showing the operation of the hydraulic cleaning apparatus for a particulate matter reduction device according to the present invention.

FIGS. 7 to 9 show a second embodiment of the present invention, in which an exhaust hole 18 is formed in a rear surface of the cleaning room 13 of the main body 10, and an exhaust pipe 19 extending rearward from the main body 10 is provided on the exhaust hole 18.

In addition, an insulation panel 44 formed to surround outer surfaces of the support case 21 and the particulate matter reduction device 1 placed on the support case 21, an elevating driving unit 45 connected to the insulation panel 44 to move the insulation panel 44 upward and downward, and an exhaust fan 46 provided on the exhaust pipe 19 are further provided.

As shown in FIG. 8, the insulation panel 44 is formed by bending a panel formed of an insulation material into a U shape and includes a bent portion 44a formed to surround front outer portions of the support case 21 and the particulate matter reduction device 1 placed on the support case 21, and extensions 44b extending rearward from both ends of the bent portion 44a, and a vertical height is set to be slightly less than a height of the cleaning room 13.

In this case, guide rails 44c extending vertical are provided on both sides of the rear surface of the cleaning room 13 of the main body 10, and the extension 44b is slidably coupled to the guide rails 44c in the vertical direction.

In addition, a U-shaped cut portion 16a corresponding to the insulation panel 44 is formed in the upper partition 16 so that the insulation panel 44 rises into the upper chamber 17 through the cut portion 16a.

In addition, the exhaust hole 18 is formed to be located between the extensions 44b of the insulation panel 44.

A cylinder mechanism that is connected to the insulation panel 44 and allows the insulation panel 44 to move upward and downward according to expansion and contraction is used as the elevating driving unit 45, and an upper end of the insulation panel 44 rises into the upper chamber 17, or a lower surface of the insulation panel 44 moves downward to come into close contact with the inner lower surface of the cleaning room 13.

In addition, as shown in FIG. 9, when the particulate matter reduction device 1 is cleaned, the control unit 36 controls the elevating driving unit 45 to move the insulation panel 44 that has risen into the upper chamber 17 so that the insulation panel 44 surrounds the outer portions of the support case 21 and the particulate matter reduction device 1 placed on the support case 21.

Accordingly, in a state in which the connecting member 22 is coupled to the upper end of the particulate matter reduction device 1 placed on the upper surface of the support case 21, when high-pressure water and air are supplied to the connecting member 22 and the water or air is dispersed to the surroundings through a gap between the connecting member and the particulate matter reduction device 1 or a gap between the particulate matter reduction device 1 and the support case 21, the water or air can be prevented from colliding with the inner surface of the insulation panel 44 and being dispersed to the surroundings, thereby preventing the surroundings from being contaminated by the water or air.

In addition, since the control unit 36 drives the exhaust fan 46 while moving he insulation panel 44 downward when drying and cooling the particulate matter reduction device 1, air around the heated particulate matter reduction device 1 is discharged to the outside.

That is, when the particulate matter reduction device 1 is dried or cooled, the particulate matter reduction device 1 is heated to a high temperature, thereby increasing the surrounding temperature due to the heat generated from the particulate matter reduction device 1 and worsening an operation environment.

In this case, when the exhaust fan 46 is driven while the insulation panel 44 is moved downward, the heat generated from the particulate matter reduction device 1 is blocked by the insulation panel 44, the air around the particulate matter reduction device 1 is also discharged to the outside through the exhaust pipe 19, and external heat flows into the insulation panel 44, thereby preventing the surrounding temperature from increasing due to the heat generated from the particulate matter reduction device 1 and maintaining a comfortable operation environment.

In the hydraulic cleaning apparatus for a particulate matter reduction device formed in this way, by arranging the insulation panel 44 to surround the outer surfaces of the support case 21 and the particulate matter reduction device 1 placed on the support case 21, it is possible to prevent the operation environment from being worsened by cleaning water, air, or heat during a cleaning or drying operation.

According to a hydraulic cleaning apparatus for a particulate matter reduction device according to the present invention, when an operator places the particulate matter reduction device 1 on the support case 21 and inputs a cleaning command by manipulating the input unit 37, the control unit 36 automatically controls the water supply pump 25, the ring blower 26, the three-way valve 27, and the heater 31 to supply cleaning water and air to the particulate matter reduction device 1, thereby cleaning and drying the particulate matter reduction device 1, making it very easy to clean and dry the particulate matter reduction device.

In addition, by measuring the differential pressure of the particulate matter reduction device 1 using the differential pressure gauge 38 provided in the main body 10, it is possible to easily determine whether the particulate matter reduction filter 3 has been sufficiently cleaned.

What is claimed is:

1. A hydraulic cleaning apparatus for a particulate matter reduction device that is for cleaning a particulate matter reduction device (1) including a housing (2) which extends in a vertical direction and in which an inlet (2a) and an outlet (2b) are formed at upper and lower ends thereof and a particulate matter reduction filter (3) provided inside the housing (2), the hydraulic cleaning apparatus comprising:
   a main body (10) which is formed in a box shape with an internal space and in which the internal space is divided into a cleaning room (13), a water storage room (14), and a machine room (15) by a horizontal partition (11) and a vertical partition (12) provided therein, wherein a communication hole (11a) connecting the cleaning room (13) to the water storage room (14) is formed in the horizontal partition (11);
   a support case (21) which is provided in the cleaning room (13) of the main body (10) for the particulate matter reduction device (1) to be placed on an upper surface thereof and which has a discharge hole (21a) formed in the upper surface;
   a connecting member (22) provided on an upper portion of the support case (21) and moved upward and downward by an elevating cylinder (23) to be coupled to an upper end of the particulate matter reduction device (1) placed on the support case (21);
   a filter unit (24) provided on one side of the main body (10);
   a water supply pump (25) which is provided in the water storage room (14) and connected to the filter unit (24) by a first water supply pipe (25a) so as to press cleaning water stored in the water storage room (14) and supply the pressed cleaning water to the filter unit (24);
   a ring blower (26) provided inside the machine room (15);
   a three-way valve (27) having first and second supply port (27a, 27b) and a discharge port (27c), wherein the first supply port (27a) is connected to the filter unit (24) through a second water supply pipe (29), the second supply port (27b) is connected to the ring blower (26) through an air supply pipe (30), and the discharge port (27c) is connected to the connecting member (22) through a discharge pipe (28), and controlling cleaning water that has passed through the filter unit (24) or air supplied from the ring blower (26) to be supplied to the connecting member (22) through the discharge pipe (28) according to an operation;
   a heater (31) provided on a middle portion of the air supply pipe (30) to heat air supplied through the air supply pipe (30);
   an inlet temperature sensor (32) which is provided on the connecting member (22) and measures a temperature of air inside the connecting member (22);
   an outlet temperature sensor (33) which is provided inside the support case (21) and measures a temperature of air discharged to the support case (21);
   a humidity sensor (34) which is provided inside the support case (21) and measures humidity of the air discharged to the support case (21);
   a differential pressure sensor (35) which is provided on the air supply pipe (30) and measures a pressure of the air supplied through the air supply pipe (30);
   a branch pipe (39) branched from the air supply pipe (30);
   a differential pressure gauge (38) connected to the branch pipe (39);
   an air supply control valve (41) provided on the branch pipe (39); and
   a control unit (36) which receives signals of the inlet temperature sensor (32), the outlet temperature sensor (33), the humidity sensor (34), and the differential pressure sensor (35) and controls operations of the elevating cylinder (23), the water supply pump (25), the ring blower (26), the three-way valve (27), the heater (31), and the air supply control valve (41).

2. The hydraulic cleaning apparatus of claim 1, wherein the control unit (36) is provided with an input unit (37) that allows an operator to input a control command, and
   when the operator places the particulate matter reduction device (1) on the support case (21) and then manipulates the input unit (37) to input a cleaning command, the control unit (36) is configured to:
   control the elevating cylinder (23) to move the connecting member (22) downward so that the connecting member (22) is coupled to an upper surface of the particulate matter reduction device (1);
   control the water supply pump (25), the ring blower (26), and the three-way valve (27) so that the cleaning water and the air are supplied to the particulate matter reduction device (1) through the connecting member (22) to clean the particulate matter reduction filter (3) of the particulate matter reduction device (1);

stop the water supply pump (25) when a preset time has elapsed;
   control the ring blower (26), the three-way valve (27), and the heater (31) to supply high-temperature air to the particulate matter reduction device (1) through the connecting member (22) to dry the particulate matter reduction device (1);
   receive a signal of the humidity sensor (34) and, when humidity inside the support case (21) reaches target humidity, stop the heater (31) and cool the particulate matter reduction device (1) using the air supplied by the ring blower (26); and
   stop the ring blower (26) to complete the operation when the temperature inside the support case (21) reaches a pre-input cooling temperature.

3. The hydraulic cleaning apparatus of claim 2, wherein, when the operator places the particulate matter reduction device (1) on the support case (21) and then manipulates the input unit (37) to input a differential pressure measurement command,
   the control unit (36) is configured to:
   control the elevating cylinder (23) to move the connecting member (22) downward so that the connecting member (22) is coupled to the upper surface of the particulate matter reduction device (1);
   control the three-way valve (27) and the ring blower (26) so that high-pressure air is supplied to the connecting member (22); and
   receive a signal of the differential pressure sensor (35) to measure a pressure of the air supplied through the air supply pipe (30) so as to measure differential pressure.

4. The hydraulic cleaning apparatus of claim 2,
   wherein the main body (10) is provided with an upper partition (16), which is provided at a higher location than the horizontal partition (11) and forms an upper chamber (17) on an upper portion of the cleaning room (13),
   an exhaust hole (18) is formed in a rear surface of the cleaning room (13) of the main body (10),
   an exhaust pipe (19) extending rearward from the main body (10) is provided in the exhaust hole (18),
   an insulation panel (44) includes a bent portion (44*a*) disposed to surround front outer portions of the support case (21) and the particulate matter reduction device (1) placed on the support case (21) and extensions (44*b*) extending rearward from both ends of the bent portion (44*a*) so that both ends are coupled to an inner rear surface of the cleaning room (13) to be movable upward and downward,
   an elevating driving unit (45) connected to the insulation panel (44) to elevate the insulation panel (44) and an exhaust fan (46) provided in the exhaust pipe (19) are further provided,
   the exhaust hole (18) is formed to be located between the extensions (44*b*) of the insulation panel (44),
   a cut portion (16*a*) corresponding to the insulation panel (44) is formed in the upper partition (16) so that the insulation panel (44) rises into the upper chamber (17) through the cut portion (16*a*), and
   the control unit (36) controls the elevating driving unit (45), when cleaning the particulate matter reduction device (1), to move the insulation panel (44) that has risen into the upper chamber (17) downward so that the insulation panel (44) surrounds the outer portions of the support case (21) and the particulate matter reduction device (1) placed on the support case (21) and drives the exhaust fan (46) while moving the insulation panel (44) downward when drying and cleaning the particulate matter reduction device (1) to discharge air around the heated particulate matter reduction device (1) to the outside.

* * * * *